US 12,431,068 B2

(12) United States Patent
Kim et al.

(10) Patent No.: US 12,431,068 B2
(45) Date of Patent: Sep. 30, 2025

(54) GATE DRIVING CIRCUIT AND DISPLAY DEVICE INCLUDING THE SAME

(71) Applicant: Samsung Display Co., LTD., Yongin-si (KR)

(72) Inventors: Hyuk Kim, Yongin-si (KR); Boyong Chung, Yongin-si (KR); Doo-Young Lee, Yongin-si (KR); Tak-Young Lee, Yongin-si (KR); Sang-Uk Lim, Yongin-si (KR)

(73) Assignee: Samsung Display Co., LTD., Gyeonggi-do (KR)

( * ) Notice: Subject to any disclaimer, the term of this patent is extended or adjusted under 35 U.S.C. 154(b) by 0 days.

(21) Appl. No.: 18/437,029

(22) Filed: Feb. 8, 2024

(65) Prior Publication Data

US 2024/0395191 A1 Nov. 28, 2024

(30) Foreign Application Priority Data

May 23, 2023 (KR) ........................ 10-2023-0066027

(51) Int. Cl.
*G09G 3/32* (2016.01)
*G06F 3/041* (2006.01)
*G06F 3/044* (2006.01)

(52) U.S. Cl.
CPC ........... *G09G 3/32* (2013.01); *G06F 3/04166* (2019.05); *G06F 3/0443* (2019.05); *G09G 2300/0426* (2013.01); *G09G 2310/0243* (2013.01); *G09G 2310/0267* (2013.01); *G09G 2310/08* (2013.01)

(58) Field of Classification Search
CPC ............ G09G 3/32; G09G 2300/0426; G09G 2310/0243; G09G 2310/0267; G09G 2310/08; G09G 3/3233; G09G 3/3266; G09G 2310/0264; G09G 2320/0214; G06F 3/04166; G06F 3/0443
See application file for complete search history.

(56) References Cited

U.S. PATENT DOCUMENTS

2021/0210019 A1\* 7/2021 Han ........................ H10K 59/38

FOREIGN PATENT DOCUMENTS

KR 10-2021-0089296 7/2021

\* cited by examiner

*Primary Examiner* — Rodney Amadiz
(74) *Attorney, Agent, or Firm* — Harness, Dickey & Pierce, P.L.C.

(57) ABSTRACT

A gate driving circuit includes a stage which outputs a scan signal based on a scan clock signal, a voltage of a first node, and a voltage of a second node, and outputs a sensing signal based on a sensing clock signal, a voltage of the first node, and a voltage of the second node. The stage includes a second sensing portion including transistors electrically connected in series and a first pull-up control portion including transistors electrically connected in series, the transistors including control electrodes electrically connected to each other. A first intermediate node between the transistors of the second sensing portion is separated from a second intermediate node between the transistors of the first pull-up control portion.

17 Claims, 8 Drawing Sheets

GATE DRIVING CIRCUIT AND DISPLAY DEVICE INCLUDING THE SAME

CROSS-REFERENCE TO RELATED APPLICATION(S)

This application claims priority to and benefits of Korean Patent Application No. 10-2023-0066027 under 35 U.S.C. § 119 filed on May 23, 2023 in the Korean Intellectual Property Office, the entire contents of which are incorporated herein by reference herein.

BACKGROUND

1. Technical Field

Embodiments relate to a display device. For example, embodiments related to a gate driving circuit for decreasing current leakage and a display device including the gate driving circuit.

2. Description of the Related Art

A display device may include a display panel and a display panel driver. The display panel may include pixels for displaying an image. The display panel driver may include a gate driver that provides gate signals to the pixels and a data driver that provides data voltages to the pixels.

In case that current leakage occurs in the gate driver, a voltage level of the gate signal output from the gate driver may be lowered, and a driving margin of the gate signal may decrease. In case that the driving margin of the gate signal decreases, reliability of the display device may decrease.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide a gate driving circuit for preventing the occurrence of current leakage.

Embodiments provide a display device with improved reliability.

A gate driving circuit according to embodiments may include a stage which outputs a scan signal based on a scan clock signal, a voltage of a first node, and a voltage of a second node, and outputs a sensing signal based on a sensing clock signal, a voltage of the first node, and a voltage of the second node. The stage may include a second sensing portion including transistors electrically connected in series and a first pull-up control portion including transistors electrically connected in series, the transistors including control electrodes electrically connected to each other. A first intermediate node between the transistors of the second sensing portion may be separated from a second intermediate node between the transistors of the first pull-up control portion.

In an embodiment, the stage may further include a first sensing portion. The first sensing portion may include a $21^{st}$ transistor, a $22^{nd}$ transistor, and a $23^{rd}$ transistor. The $21^{st}$ transistor may include a control electrode receiving a first signal, a first electrode receiving a previous carry signal, and a second electrode electrically connected to the first intermediate node. The $22^{nd}$ transistor may include a control electrode electrically connected to a third node, a first electrode receiving a high voltage, and a second electrode electrically connected to the first intermediate node. The $23^{rd}$ transistor may include a control electrode receiving the first signal, a first electrode electrically connected to the first intermediate node, and a second electrode electrically connected to the third node.

In an embodiment, wherein the second sensing portion may include a $24^{th}$ transistor, a $25\text{-}1^{st}$ transistor, a $25\text{-}2^{nd}$ transistor, and a $3^{rd}$ capacitor. The $24^{th}$ transistor may include a control electrode electrically connected to the third node, a first electrode receiving the high voltage, and a second electrode. The $25\text{-}1^{st}$ transistor may include a control electrode receiving a second signal, a first electrode electrically connected to the second electrode of the $24^{th}$ transistor, and a second electrode electrically connected to the first intermediate node. The $25\text{-}2^{nd}$ transistor may include a control electrode electrically connected to the control electrode of the $25\text{-}1^{st}$ transistor, a first electrode electrically connected to the first intermediate node, and a second electrode electrically connected to the first node. The $3^{rd}$ capacitor may include a first electrode receiving the high voltage and a second electrode electrically connected to the third node.

In an embodiment, the transistors of the second sensing portion may be the $25\text{-}1^{st}$ transistor and the $25\text{-}2^{nd}$ transistor.

In an embodiment, the second sensing portion may include a $24^{th}$ transistor, a $25^{th}$ transistor, and a $3^{rd}$ capacitor. The $24^{th}$ transistor may include a control electrode electrically connected to the third node, a first electrode receiving the high voltage, and a second electrode electrically connected to the first intermediate node. The $25^{th}$ transistor may include a control electrode receiving a second signal, a first electrode electrically connected to the first intermediate node, and a second electrode electrically connected to the first node. The $3^{rd}$ capacitor may include a first electrode receiving the high voltage and a second electrode electrically connected to the third node.

In an embodiment, the transistors of the second sensing portion may be the $24^{th}$ transistor and the $25^{th}$ transistor.

In an embodiment, the first sensing portion may further include a $26^{th}$ transistor and a $27^{th}$ transistor. The $26^{th}$ transistor may include a control electrode receiving the second signal, a first electrode, and a second electrode electrically connected to the second node. The $27^{th}$ transistor may include a control electrode electrically connected to the third node, a first electrode receiving a first low voltage, and a second electrode electrically connected to the first electrode of the $26^{th}$ transistor.

In an embodiment, the first pull-up control portion may include a $4\text{-}1^{st}$ transistor and a $4\text{-}2^{nd}$ transistor. The $4\text{-}1^{st}$ transistor may include a control electrode receiving a previous carry signal, a first electrode electrically connected to the second intermediate node, and a second electrode electrically connected to the first node. The $4\text{-}2^{nd}$ transistor may include a control electrode electrically connected to the control electrode of the $4\text{-}1^{st}$ transistor, a first electrode receiving the previous carry signal, and a second electrode electrically connected to the second intermediate node.

In an embodiment, the stage may further include a second pull-up control portion. The second pull-up control portion may include a $2\text{-}1^{st}$ transistor and a $2\text{-}2^{nd}$ transistor. The $2\text{-}1^{st}$ transistor may include a control electrode receiving a subsequent carry signal, a first electrode electrically connected to the second intermediate node, and a second electrode electrically connected to the first node. The 2-2$^{nd}$ transistor may include a control electrode electrically connected to the control electrode of the 2-1$^{st}$ transistor, a first electrode receiving a first low voltage, and a second electrode electrically connected to the second intermediate node.

In an embodiment, the stage may further include a third pull-up control portion. The third pull-up control portion may include a 3-1$^{st}$ transistor and a 3-2$^{nd}$ transistor. The 3-1$^{st}$ transistor may include a control electrode electrically connected to the second node, a first electrode electrically connected to the second intermediate node, and a second electrode electrically connected to the first node. The 3-2$^{nd}$ transistor may include a control electrode electrically connected to the control electrode of the 3-1$^{st}$ transistor, a first electrode receiving the first low voltage, and a second electrode electrically connected to the second intermediate node.

In an embodiment, the stage may further include a reset portion. The reset portion may include a 1-1$^{st}$ transistor and a 1-2$^{nd}$ transistor. The 1-1$^{st}$ transistor may include a control electrode receiving a fifth signal, a first electrode electrically connected to the second intermediate node, and a second electrode electrically connected to the first node. The 1-2$^{nd}$ transistor may include a control electrode electrically connected to the control electrode of the 1-1$^{st}$ transistor, a first electrode receiving the first low voltage, and a second electrode electrically connected to the second intermediate node.

In an embodiment, the stage may further include a scan output portion. The scan output portion may include a 6$^{th}$ transistor, an 8$^{th}$ transistor, and a 1$^{st}$ capacitor. The 6$^{th}$ transistor may include a control electrode electrically connected to the first node, a first electrode receiving the scan clock signal, and a second electrode electrically connected to a scan output node outputting the scan signal. The 8$^{th}$ transistor may include a control electrode electrically connected to the second node, a first electrode receiving a third low voltage, and a second electrode electrically connected to the scan output node. The 1$^{st}$ capacitor may include a first electrode electrically connected to the first node and a second electrode electrically connected to the scan output node.

In an embodiment, the stage may further include a sensing output portion. The sensing output portion may include a 9$^{th}$ transistor, an 11$^{th}$ transistor, and a 2$^{nd}$ capacitor. The 9$^{th}$ transistor may include a control electrode electrically connected to the first node, a first electrode receiving the sensing clock signal, and a second electrode electrically connected to a sensing output node outputting the sensing signal. The 11$^{th}$ transistor may include a control electrode electrically connected to the second node, a first electrode receiving the third low voltage, and a second electrode electrically connected to the sensing output node. The 2$^{nd}$ capacitor may include a first electrode electrically connected to the first node and a second electrode electrically connected to the sensing output node.

In an embodiment, the stage may further include a carry output portion. The carry output portion may include a 12$^{th}$ transistor and a 14$^{th}$ transistor. The 12$^{th}$ transistor may include a control electrode electrically connected to the first node, a first electrode receiving a carry clock signal, and a second electrode electrically connected to a carry output node outputting a carry signal. The 14$^{th}$ transistor may include a control electrode electrically connected to the second node, a first electrode receiving a first low voltage, and a second electrode electrically connected to the carry output node.

In an embodiment, the stage may further include an inverting portion. The inverting portion may include a 15-1$^{st}$ transistor, a 15-2$^{nd}$ transistor, and an 18$^{th}$ transistor. The 15-1$^{st}$ transistor may include a control electrode receiving a third signal, a first electrode receiving the third signal, and a second electrode. The 15-2$^{nd}$ transistor may include a control electrode electrically connected to the control electrode of the 15-1$^{st}$ transistor, a first electrode electrically connected to the second electrode of the 15-1$^{st}$ transistor, and a second electrode. The 18$^{th}$ transistor may include a control electrode electrically connected to the second electrode of the 15-2$^{nd}$ transistor, a first electrode receiving the third signal, and a second electrode electrically connected to the second node.

In an embodiment, the inverting portion may further include a 16$^{th}$ transistor. The 16$^{th}$ transistor may include a control electrode electrically connected to the first node, a first electrode receiving a second low voltage, and a second electrode electrically connected to the control electrode of the 18$^{th}$ transistor.

In an embodiment, the stage may further include a first pull-down control portion which outputs a first low voltage to the second node in response to a voltage of the first node.

In an embodiment, the stage may further include a second pull-down control portion which outputs the first low voltage to the second node in response to a previous carry signal.

In an embodiment, the stage may further include a stabilization portion which outputs a high voltage to the second intermediate node in response to a voltage of the first node.

A display device according to embodiments may include a display panel, a gate driver which outputs a plurality of scan signals and a plurality of sensing signals to the display panel, and a data driver which outputs a plurality of data voltages to the display panel. The gate driver may include a stage which outputs a scan signal among the plurality of the scan signals based on a scan clock signal, a voltage of a first node, and a voltage of a second node, and outputs a sensing signal among the plurality of sensing signals based on a sensing clock signal, a voltage of the first node, and a voltage of the second node. The stage may include a sensing portion including transistors electrically connected in series and a pull-up control portion including transistors electrically connected in series, the transistors including control electrodes electrically connected to each other. A first intermediate node between the transistors of the second sensing portion may be separated from a second intermediate node between the transistors of the first pull-up control portion.

The gate driving circuit according to the embodiments may include the stage in which the first intermediate node between the transistors of the second sensing portion is separated from the second intermediate node between the transistors of the first pull-up control portion, so that the current leakage through the second intermediate node from the first intermediate node in the sensing period may not occur.

In the display device, the voltage level of the gate signal output from the gate driving circuit may not decrease, so that the reliability of the display device may be improved.

BRIEF DESCRIPTION OF THE DRAWINGS

Illustrative, non-limiting embodiments will be more clearly understood from the following detailed description taken in conjunction with the accompanying drawings in which.

DETAILED DESCRIPTION OF THE EMBODIMENTS

Hereinafter, a gate driving circuit and a display device according to embodiments will be described in more detail with reference to the accompanying drawings. The same or similar reference numerals will be used for the same elements in the accompanying drawings.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

Embodiments may be described and illustrated in the accompanying drawings in terms of functional blocks, units, and/or modules.

Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software.

It is also contemplated that each block, unit, and/or module may be implemented by dedicated hardware, or as a combination of dedicated hardware to perform some functions and a processor (for example, one or more programmed microprocessors and associated circuitry) to perform other functions.

Each block, unit, and/or module of embodiments may be physically separated into two or more interacting and discrete blocks, units, and/or modules without departing from the scope of the disclosure.

Further, the blocks, units, and/or modules of embodiments may be physically combined into more complex blocks, units, and/or modules without departing from the scope of the disclosure.

Figure 1:
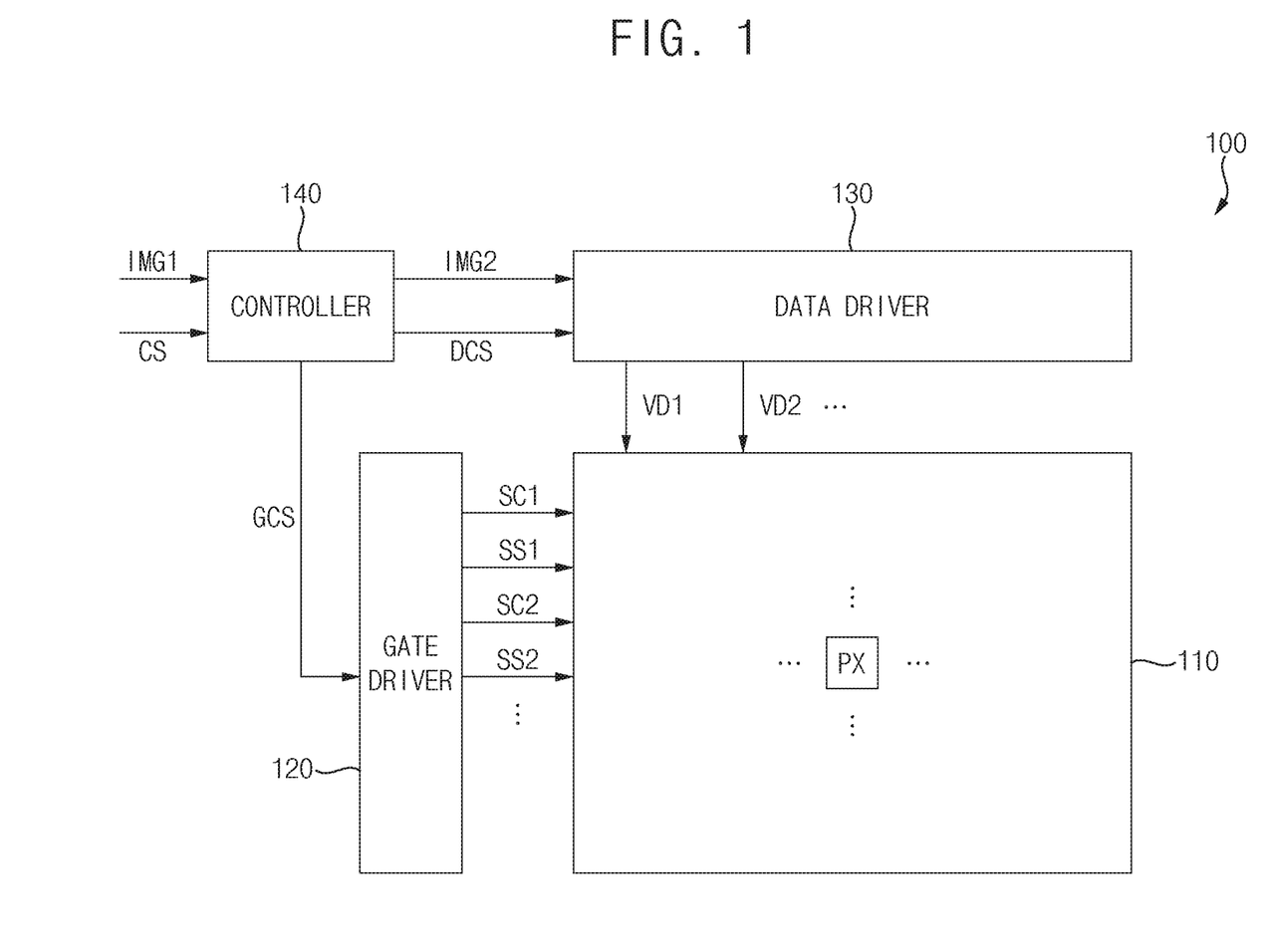
FIG. 1 is a block diagram illustrating a display device according to an embodiment.

FIG. 1 is a block diagram illustrating a display device 100 according to an embodiment.

Referring to FIG. 1, a display device 100 may include a display panel 110, a gate driver (or gate driving circuit) 120, a data driver (or data driving circuit) 130, and a controller (or control circuit) 140.

The display panel 110 may include a plurality of pixels PX. The pixels PX may display an image based on scan signals SC1, SC2, . . . , sensing signals SS1, SS2, . . . , and data voltages VD1, VD2, . . . .

The gate driver 120 may output gate signals to the display panel 110. The gate signals may include the scan signals SC1, SC2, . . . and the sensing signals SS1, SS2, . . . . The gate driver 120 may generate the scan signals SC1, SC2, . . . and the sensing signals SS1, SS2, . . . based on a gate control signal GCS.

The data driver 130 may output the data voltages VD1, VD2, . . . to the display panel 110. The data driver 130 may generate the data voltages VD1, VD2, . . . based on second image data IMG2 and a data control signal DCS. The second image data IMG2 may include grayscale values respectively corresponding to the pixels PX. The data control signal DCS may include a data clock signal, a horizontal start signal, a load signal, or the like within the spirit and the scope of the disclosure.

The controller 140 may control an operation (or driving) of the gate driver 120 and an operation (or driving) of the data driver 130. The controller 140 may output the gate control signal GCS to the gate driver 120. The controller 140 may output the second image data IMG2 and the data control signal DCS to the data driver 130. The controller 140 may generate the gate control signal GCS, the second image data IMG2, and the data control signal DCS based on first image data IMG1 and a control signal CS. The first image data IMG1 may include grayscale values respectively corresponding to the pixels PX. The controller 140 may convert the first image data IMG1 into the second image data IMG2. The control signal CS may include a master clock signal, a horizontal start signal, a vertical start signal, a data enable signal, or the like within the spirit and the scope of the disclosure.

Figure 2:
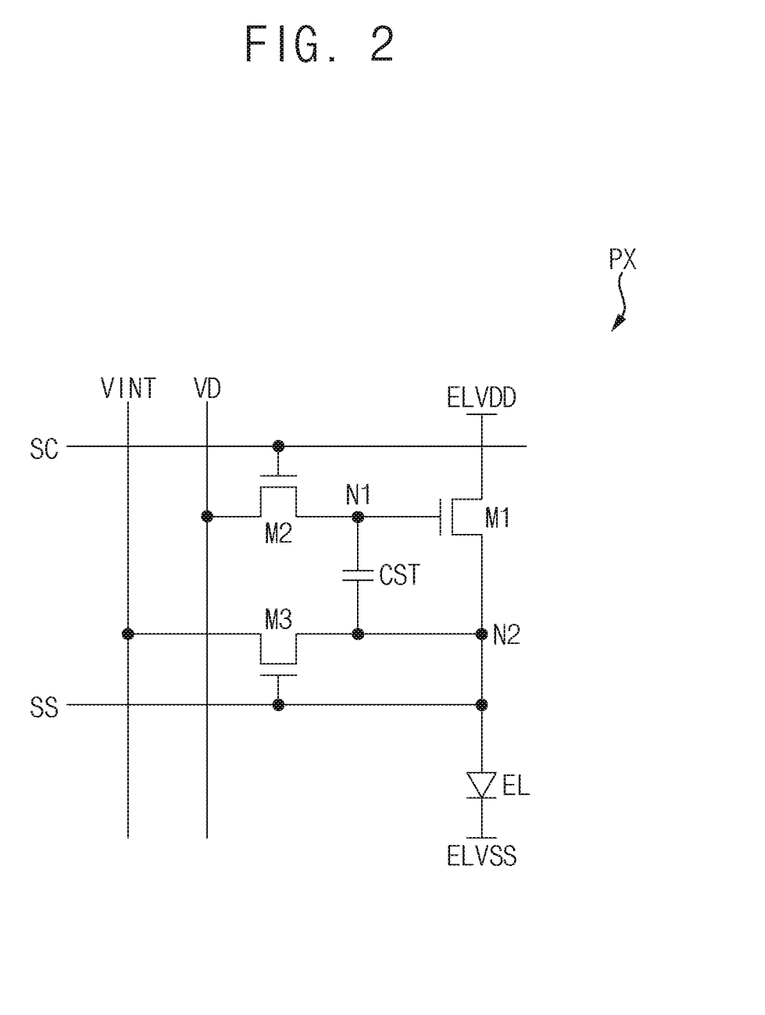
FIG. 2 is a schematic circuit diagram illustrating a pixel included in the display device in FIG. 1.

FIG. 2 is a schematic circuit diagram illustrating the pixel PX included in the display device 100 in FIG. 1.

Referring to FIG. 2, the pixel PX may receive a scan signal SC, a sensing signal SS, a data voltage VD, an initialization voltage VINT, a first pixel voltage ELVDD, and a second pixel voltage ELVSS. A voltage level of the first pixel voltage ELVDD may be higher than a voltage level of the second pixel voltage ELVSS. The pixel PX may include a first pixel transistor M1, a second pixel transistor M2, a third pixel transistor M3, a storage capacitor CST, and a light emitting diode EL.

The first pixel transistor M1 may include a control electrode connected to a first pixel node N1, a first electrode receiving the first pixel voltage ELVDD, and a second electrode connected to a second pixel node N2. The first pixel transistor M1 may generate a driving current based on a voltage between the first pixel node N1 and the second pixel node N2. The first pixel transistor M1 may be referred as a driving transistor.

The second pixel transistor M2 may include a control electrode receiving the scan signal SC, a first electrode receiving the data voltage VD, and a second electrode connected to the first pixel node N1. The second pixel transistor M2 may provide the data voltage VD to the first pixel node N1 in response to the scan signal SC. The second pixel transistor M2 may be referred as a switching transistor or a write transistor.

The third pixel transistor M3 may include a control electrode receiving the sensing signal SS, a first electrode receiving the initialization voltage VINT, and a second electrode connected to the second pixel node N2. The third pixel transistor M3 may provide the initialization voltage VINT to the second pixel node N2 in response to the sensing signal SS. The third pixel transistor M3 may be referred as an initialization transistor or a sensing transistor.

FIG. 2 illustrates an embodiment in which each of the first pixel transistor M1, the second pixel transistor M2, and the third pixel transistor M3 is an N-type transistor (for example, NMOS transistor), but the disclosure is not limited thereto. In an embodiment, at least one of the first pixel transistor M1, the second pixel transistor M2, and the third pixel transistor M3 may be a P-type transistor (for example, PMOS transistor).

The storage capacitor CST may include a first electrode connected to the first pixel node N1 and a second electrode connected to the second pixel node N2. The storage capacitor CST may store the voltage between the first pixel node N1 and the second pixel node N2.

FIG. 2 illustrates an embodiment in which the pixel PX may include three transistors and one capacitor, but the disclosure is not limited thereto. In an embodiment, the pixel PX may include two, four or more transistors and/or two or more capacitors. It is to be understood that the numbering or labeling of the transistors and the capacitors as described and illustrated herein may vary accordingly.

The light emitting diode EL may include a first electrode (or anode) connected to the second pixel node N2 and a second electrode (or cathode) receiving the second pixel voltage ELVSS. The light emitting diode EL may emit light based on the driving current provided from the first pixel transistor M1.

Figure 3:
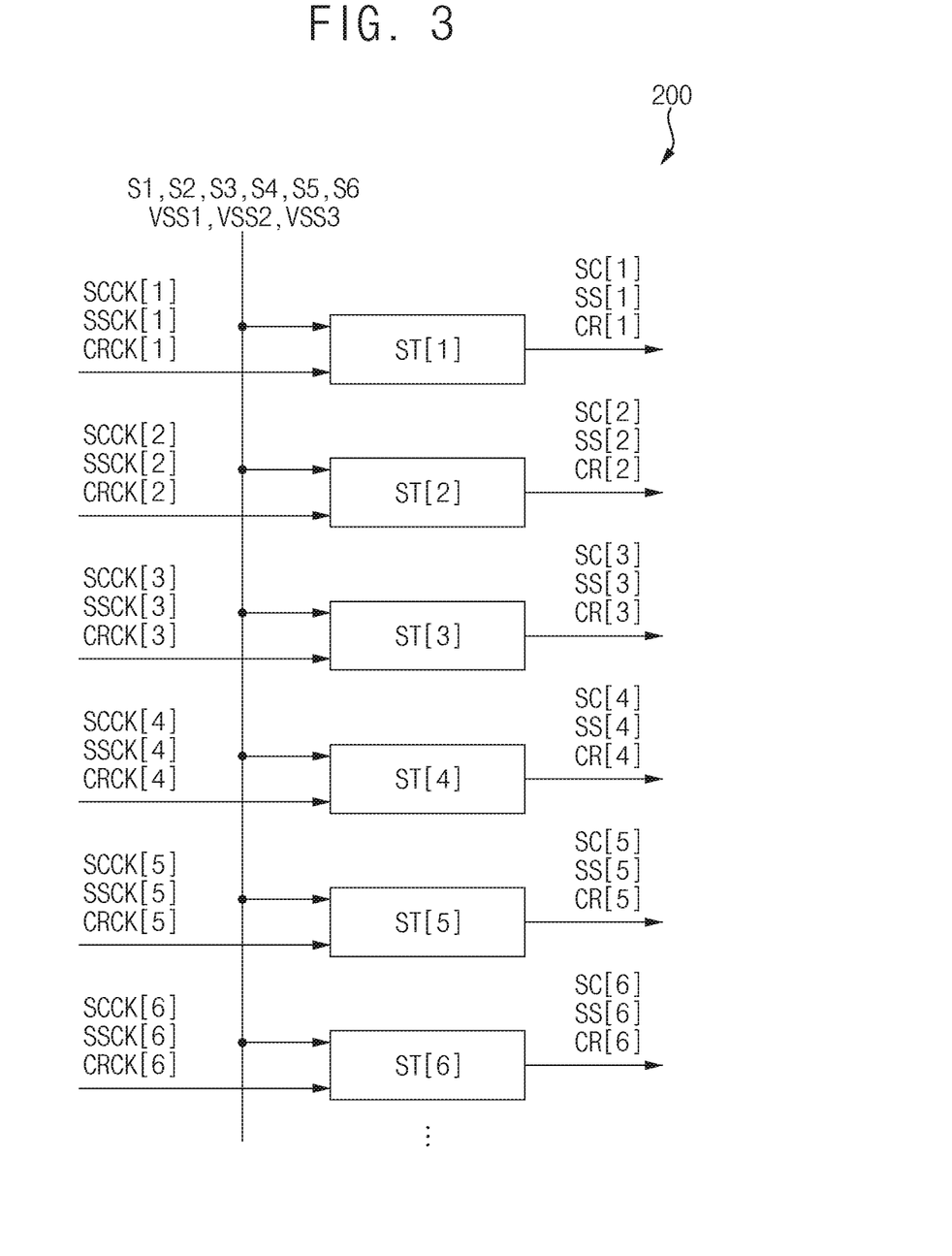
FIG. 3 is a block diagram illustrating a gate driver according to an embodiment.

FIG. 3 is a block diagram illustrating a gate driver 200 according to an embodiment. The gate driver 200 in FIG. 3 may correspond to the gate driver 120 in FIG. 1.

Referring to FIG. 3, the gate driver 200 may receive the gate control signal GCS in FIG. 1, and may output the scan signals SC[1], SC[2], SC[3], SC[4]), SC[5], SC[6], . . . , the sensing signals SS[1], SS[2], SS[3], SS[4], SS[5], SS[6], . . . , and carry signals CR[1], CR[2], CR[3], CR[4], CR[5], CR[6], . . . . The gate control signal GCS may include scan clock signals SCCK[1], SCCK[2], SCCK[3], SCCK[4], SCCK[5], and SCCK[6], sensing clock signals SSCK[1], SSCK[2], SSCK[3], SSCK[4], SSCK[5], and SSCK[6], carry clock signals CRCK[1], CRCK[2], CRCK[3], CRCK[4], CRCK[5], and CRCK[6], a first signal S1, a second signal S2, a third signal S3, a fourth signal S4, a fifth signal S5, a sixth signal S6, a first low voltage VSS1, a second low voltage VSS2, and a third low voltage VSS3.

The sixth signal S6 may be a high voltage sufficient to turn-on an N-type transistor, and each of the first low voltage VSS1, the second low voltage VSS2, and the third low voltage VSS3 may be a low voltage sufficient to turn-off the N-type transistor. In an embodiment, a voltage level of the first low voltage VSS1 may be higher than a voltage level of the second low voltage VSS2 and a voltage level of the third low voltage VSS3. The voltage level of the second low voltage VSS2 may be substantially equal to or different from the voltage level of the third low voltage VSS3.

The gate driver 200 may include stages ST[1], ST[2], ST[3], ST[4], ST[5], ST[6], . . . . Each of the stages ST[1], ST[2], ST[3], ST[4], ST[5], ST[6], . . . may receive the first signal S1, the second signal S2, the fifth signal S5, the sixth signal S6, the first low voltage VSS1, the second low voltage VSS2, and the third low voltage VSS3. Each of the stages ST[1], ST[2], ST[3], ST[4], ST[5], ST[6], . . . may receive the third signal S3 or the fourth signal S4. In an embodiment, each of the odd-numbered stages ST[1], ST[3], ST[5], . . . may receive the third signal S3, and each of the even-numbered stages ST[2], ST[4], ST[6], . . . may receive the fourth signal S4.

The first stage ST[1] may receive a first scan clock signal SCCK[1], a first sensing clock signal SSCK[1], and a first carry clock signal CRCK[1], and may output a first scan signal SC[1], a first sensing signal SS[1], and a first carry signal CR[1]. The second stage ST[2] may receive a second scan clock signal SCCK[2], a second sensing clock signal SSCK[2], and a second carry clock signal CRCK[2], and may output a second scan signal SC[2], a second sensing signal SS[2], and a second carry signal CR[2]. The third stage ST[3] may receive a third scan clock signal SCCK[3], a third sensing clock signal SSCK[3], and a third carry clock signal CRCK[3], and may output a third scan signal SC[3], a third sensing signal SS[3], and a third carry signal CR[3]. The fourth stage ST[4] may receive a fourth scan clock signal SCCK[4], a fourth sensing clock signal SSCK[4], and a fourth carry clock signal CRCK[4], and may output a fourth scan signal SC[4], a fourth sensing signal SS[4], and a fourth carry signal CR[4]. The fifth stage ST[5] may receive a fifth scan clock signal SCCK[5], a fifth sensing clock signal SSCK[5], and a fifth carry clock signal CRCK[5], and may output a fifth scan signal SC[5], a fifth sensing signal SS[5], and a fifth carry signal CR[5]. The sixth stage ST[6] may receive a sixth scan clock signal SCCK[6], a sixth sensing clock signal SSCK[6], and a sixth carry clock signal CRCK[6], and may output a sixth scan signal SC[6], a sixth sensing signal SS[6], and a sixth carry signal CR[6].

Each of the stages ST[1], ST[2], ST[3], ST[4], ST[5], ST[6], . . . may output the scan signal based on the scan clock signal, a voltage of a first node, and a voltage of a second node, may output the sensing signal based on the sensing clock signal, the voltage of the first node, and the voltage of the second node, and may output the carry signal based on the carry clock signal, the voltage of the first node, and the voltage of the second node. Each of the stages ST[1], ST[2], ST[3], ST[4], ST[5], ST[6], . . . may include a second sensing portion including transistors connected in series, and a first pull-up control portion including transistors connected in series and including control electrodes connected to each other. A first intermediate node of the transistors of the second sensing portion may be separated from a second intermediate node of the transistors of the first pull-up control portion. Accordingly, current leakage may not occur from the first intermediate node through the second intermediate node in a sensing period, and a voltage level of the scan signal and a voltage level of the sensing signal output from each of the stages ST[1], ST[2], ST[3], ST[4], ST[5], ST[6], . . . may not decrease.

Figure 4:
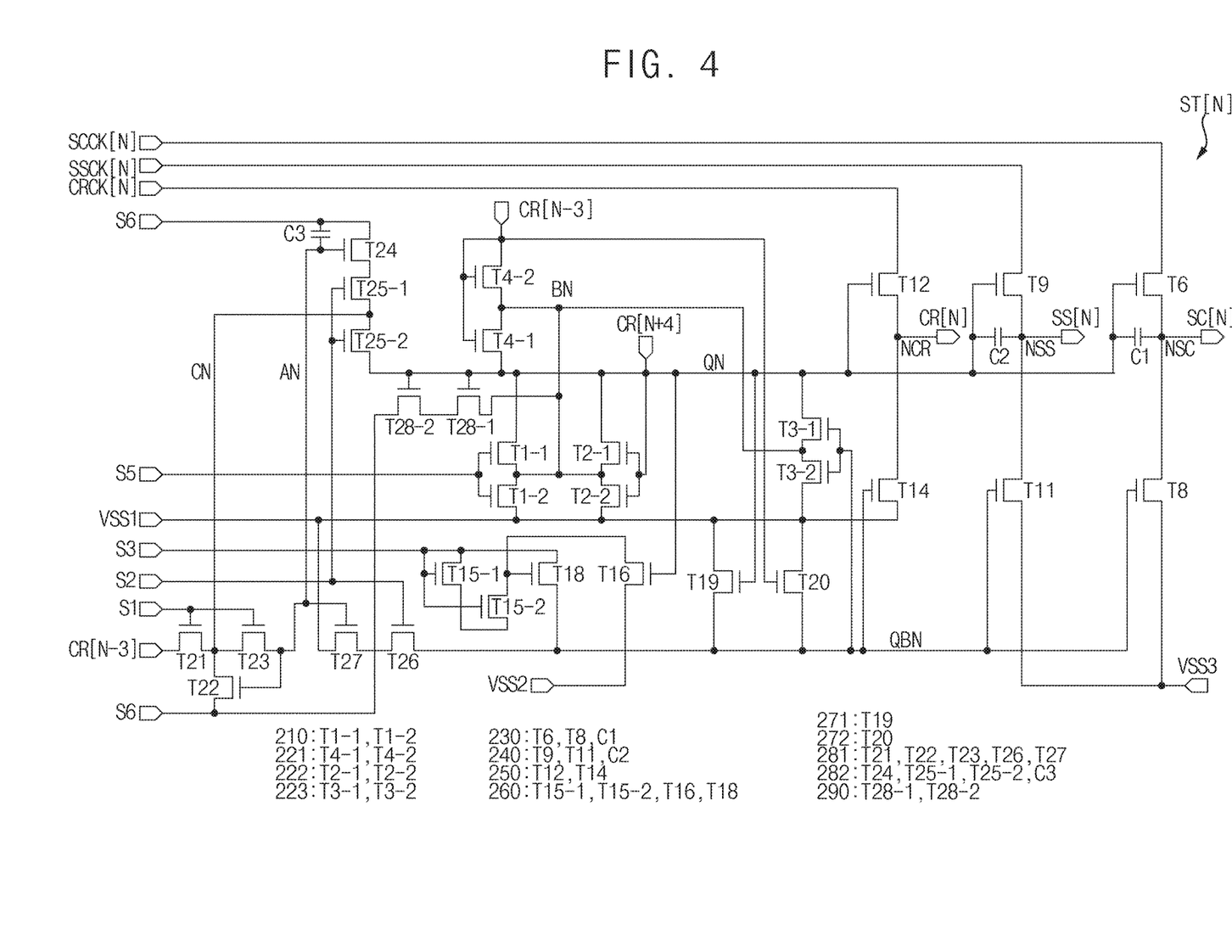
FIG. 4 is a schematic circuit diagram illustrating an example of an $N^{th}$ stage included in the gate driver in FIG. 3.

FIG. 4 is a schematic circuit diagram illustrating an example of an $N^{th}$ stage ST[N] included in the gate driver 200 in FIG. 3.

Referring to FIG. 4, an $N^{th}$ stage ST[N] may receive an $N^{th}$ scan clock signal SCCK[N], an $N^{th}$ sensing clock signal SSCK[N], an $N^{th}$ carry clock signal CRCK[N], the first signal S1, the second signal S2, the third signal S3, the fifth signal S5, the sixth signal S6, the first low voltage VSS1, the second low voltage VSS2, the third low voltage VSS3, a previous carry signal, and a subsequent carry signal, and may output an $N^{th}$ scan signal SC[N], an $N^{th}$ sensing signal SS[N], and an $N^{th}$ carry signal CR[N]. In an embodiment, the previous carry signal may be an $N-3^{th}$ carry signal CR[N−3], but the previous carry signal is not limited thereto. In an embodiment, the subsequent carry signal may be an $N+4^{th}$ carry signal CR[N+4], but the subsequent carry signal is not limited thereto.

The $N^{th}$ stage ST[N] may include a reset portion 210, a first pull-up control portion 221, a second pull-up control portion 222, a third pull-up control portion 223, a scan output portion 230, a sensing output portion 240, a carry output portion 250, an inverting portion 260, a first pull-down control portion 271, a second pull-down control portion 272, a first sensing portion 281, a second sensing portion 282, and a stabilization portion 290.

The reset portion 210 may output the first low voltage VSS1 to a first node QN in response to the fifth signal S5. The reset portion 210 may include a $1^{st}$ transistor. The $1^{st}$ transistor may include a control electrode receiving the fifth signal S5, a first electrode receiving the first low voltage VSS1, and a second electrode connected to the first node QN.

In an embodiment, the $1^{st}$ transistor may include a 1-$1^{st}$ transistor T1-1 and a 1-$2^{nd}$ transistor T1-2 connected in series and including control electrodes connected to each other. The 1-$1^{st}$ transistor T1-1 may include a control electrode receiving the fifth signal S5, a first electrode connected to a second intermediate node BN, and a second electrode connected to the first node QN. The 1-$2^{nd}$ transistor T1-2 may include a control electrode connected to the control electrode of the 1-$1^{st}$ transistor T1-1, a first electrode receiving the first low voltage VSS1, and a second electrode connected to the second intermediate node BN.

The first pull-up control portion 221 may output the previous carry signal CR[N−3] to the first node QN in response to the previous carry signal CR[N−3]. The first pull-up control portion 221 may include a $4^{th}$ transistor. The $4^{th}$ transistor may include a control electrode receiving the previous carry signal CR[N−3], a first electrode receiving the previous carry signal CR[N−3], and a second electrode connected to the first node QN.

In an embodiment, the $4^{th}$ transistor may include a 4-$1^{st}$ transistor T4-1 and a 4-$2^{nd}$ transistor T4-2 connected in series and including control electrodes connected to each other. The 4-$1^{st}$ transistor T4-1 may include a control electrode receiving the previous carry signal CR[N−3], a first electrode connected to the second intermediate node BN, and a second electrode connected to the first node (QN). The 4-$2^{nd}$ transistor T4-2 may include a control electrode connected to the control electrode of the 4-$1^{st}$ transistor T4-1, a first electrode receiving the previous carry signal CR[N−3], and a second electrode connected to the second intermediate node BN.

The second pull-up control portion 222 may output the first low voltage VSS1 to the first node QN in response to the subsequent carry signal CR[N+4]. The second pull-up control portion 222 may include a $2^{nd}$ transistor. The $2^{nd}$ transistor may include a control electrode receiving the subsequent carry signal CR[N+4], a first electrode receiving the first low voltage VSS1, and a second electrode connected to the first node QN.

In an embodiment, the $2^{nd}$ transistor may include a 2-$1^{st}$ transistor T2-1 and a 2-$2^{nd}$ transistor T2-2 connected in series and including control electrodes connected to each other. The 2-$1^{st}$ transistor T2-1 may include a control electrode receiving the subsequent carry signal CR[N+4], a first electrode connected to the second intermediate node BN, and a second electrode connected to the first node QN. The 2-$2^{nd}$ transistor T2-2 may include a control electrode connected to the control electrode of the 2-$1^{st}$ transistor T2-1, a first electrode receiving the first low voltage VSS1, and a second electrode connected to the second intermediate node BN.

The third pull-up control portion 223 may output the first low voltage VSS1 to the first node QN in response to a voltage of a second node QBN. The third pull-up control portion 223 may include a $3^{rd}$ transistor. The $3^{rd}$ transistor may include a control electrode connected to the second node QBN, a first electrode receiving the first low voltage VSS1, and a second electrode connected to the first node QN.

In an embodiment, the $3^{rd}$ transistor may include a 3-$1^{st}$ transistor T3-1 and a 3-$2^{nd}$ transistor T3-2 connected in series and including control electrodes connected to each other. The 3-$1^{st}$ transistor T3-1 may include a control electrode connected to the second node QBN, a first electrode connected to the second intermediate node BN, and a second electrode connected to the first node QN. The 3-$2^{nd}$ transistor T3-2 may include a control electrode connected to the control electrode of the 3-$1^{st}$ transistor T3-1, a first electrode receiving the first low voltage VSS1, and a second electrode connected to the second intermediate node BN.

The scan output portion 230 may output the $N^{th}$ scan clock signal SCCK[N] or the third low voltage VSS3 as the $N^{th}$ scan signal SC[N] to a scan output node NSC in response to the voltage of the first node QN and the voltage of the second node QBN. The scan output portion 230 may include a $6^{th}$ transistor T6, an $8^{th}$ transistor T8, and a $1^{st}$ capacitor C1. The $6^{th}$ transistor T6 may include a control electrode connected to the first node QN, a first electrode receiving the $N^{th}$ scan clock signal SCCK[N], and a second electrode connected to the scan output node NSC. The $8^{th}$ transistor T8 may include a control electrode connected to the second node QBN, a first electrode receiving the third low voltage VSS3, and a second electrode connected to the scan output node NSC. The $1^{st}$ capacitor C1 may include a first electrode connected to the first node QN and a second electrode connected to the scan output node NSC.

The sensing output portion 240 may output the $N^{th}$ sensing clock signal SSCK[N] or the third low voltage VSS3 as the $N^{th}$ sensing signal SS[N] to a sensing output node NSS in response to the voltage of the first node QN and the voltage of the second node QBN. The sensing output portion 240 may include a $9^{th}$ transistor T9, an $11^{th}$ transistor T11, and a $2^{nd}$ capacitor C2. The $9^{th}$ transistor T9 may include a control electrode connected to the first node QN, a first electrode receiving the $N^{th}$ sensing clock signal SSCK[N], and a second electrode connected to the sensing output node NSS. The $11^{th}$ transistor T11 may include a control electrode connected to the second node QBN, a first electrode receiving the third low voltage VSS3, and a second electrode connected to the sensing output node NSS. The $2^{nd}$ capacitor C2 may include a first electrode connected to the first node QN and a second electrode connected to the sensing output node NSS.

The carry output portion 250 may output the $N^{th}$ carry clock signal CRCK[N] or the first low voltage VSS1 as the $N^{th}$ carry signal CR[N] to a carry output node NCR in response to the voltage of the first node QN and the voltage of the second node QBN. The carry output portion 250 may include a $12^{th}$ transistor T12 and a $14^{th}$ transistor T14. The $12^{th}$ transistor T12 may include a control electrode connected to the first node QN, a first electrode receiving the $N^{th}$ carry clock signal CRCK[N], and a second electrode connected to the carry output node NCR. The $14^{th}$ transistor T14 may include a control electrode connected to the second node QBN, a first electrode receiving the first low voltage VSS1, and a second electrode connected to the carry output node NCR.

The inverting portion 260 may output the third signal S3 to the second node QBN in response to the third signal S3. The inverting portion 260 may include a $15^{th}$ transistor and an $18^{th}$ transistor T18. The $15^{th}$ transistor may include a control electrode receiving the third signal S3, a first electrode receiving the third signal S3, and a second electrode. The $18^{th}$ transistor T18 may include a control electrode connected to the second electrode of the $15^{th}$ transistor, a first electrode receiving the third signal S3, and a second electrode connected to the second node QBN.

In an embodiment, the $15^{th}$ transistor may include a 15-$1^{st}$ transistor T15-1 and a 15-$2^{nd}$ transistor T15-2 connected in series and including control electrodes connected to each other. The 15-$1^{st}$ transistor T15-1 may include a control electrode receiving the third signal S3, a first electrode receiving the third signal S3, and a second electrode. The 15-$2^{nd}$ transistor T15-2 may include a control electrode connected to the control electrode of the 15-$1^{st}$ transistor T15-1, a first electrode connected to the second electrode of the 15-$1^{st}$ transistor T15-1, and a second electrode connected to the control electrode of the $18^{th}$ transistor T18.

In an embodiment, the inverting portion 260 may further include a $16^{th}$ transistor T16. The $16^{th}$ transistor T16 may include a control electrode connected to the first node QN, a first electrode receiving the second low voltage VSS2, and a second electrode connected to the control electrode of the $18^{th}$ transistor T18. The inverting portion 260 may output the third signal S3 or the second low voltage VSS2 to the second node QBN in response to the third signal S3 and the voltage of the first node QN.

The first pull-down control portion 271 may output the first low voltage VSS1 to the second node QBN in response to the voltage of the first node QN. The first pull-down control portion 271 may include a $19^{th}$ transistor T19. The $19^{th}$ transistor T19 may include a control electrode connected to the first node QN, a first electrode receiving the first low voltage VSS1, and a second electrode connected to the second node QBN.

The second pull-down control portion 272 may output the first low voltage VSS1 to the second node QBN in response to the previous carry signal CR[N−3]. The second pull-down control portion 272 may include a $20^{th}$ transistor T20. The $20^{th}$ transistor T20 may include a control electrode receiving the previous carry signal CR[N−3], a first electrode receiving the first low voltage VSS1, and a second electrode connected to the second node QBN.

The first sensing portion 281 may include a $21^{st}$ transistor T21, a $22^{nd}$ transistor T22, and a $23^{rd}$ transistor T23. The $21^{st}$ transistor T21 may include a control electrode receiving the first signal S1, a first electrode receiving the previous carry signal CR[N−3], and a second electrode connected to a first intermediate node CN. The $22^{nd}$ transistor T22 may include a control electrode connected to a third node AN, a first electrode receiving the sixth signal S6 that is a high voltage, and a second electrode connected to the first intermediate node CN. The $23^{rd}$ transistor T23 may include a control electrode receiving the first signal S1, a first electrode connected to the first intermediate node CN, and a second electrode connected to the third node AN. The $21^{st}$ transistor T21 and the $23^{rd}$ transistor T23 may output the previous carry signal CR[N−3] to the third node AN in response to the first control signal S1. The $22^{nd}$ transistor T22 may output the sixth signal S6 to the first intermediate node CN in response to the voltage of the third node AN.

In an embodiment, the first sensing portion 281 may further include a $26^{th}$ transistor T26 and a $27^{th}$ transistor T27. The $26^{th}$ transistor T26 may include a control electrode receiving the second signal S2, a first electrode, and a second electrode connected to the second node QBN. The $27^{th}$ transistor T27 may include a control electrode connected to the third node AN, a first electrode receiving the first low voltage VSS1, and a second electrode connected to the first electrode of the $26^{th}$ transistor T26. The $26^{th}$ transistor T26 and the $27^{th}$ transistor T27 may output the first low voltage VSS1 to the second node QBN in response to the second signal S2 and the voltage of the third node AN.

The second sensing portion 282 may include a $24^{th}$ transistor T24, a $25^{th}$ transistor, and a $3^{rd}$ capacitor C3. The $24^{th}$ transistor T24 may include a control electrode connected to the third node AN, a first electrode receiving the sixth signal S6, and a second electrode. The $25^{th}$ transistor may include a control electrode receiving the second signal S2, a first electrode connected to the second electrode of the $24^{th}$ transistor T24, and a second electrode connected to the first node QN. The $3^{rd}$ capacitor C3 may include a first electrode receiving the sixth signal S6 and a second electrode connected to the third node AN. The $3^{rd}$ capacitor C3 may maintain the voltage of the third node AN.

In an embodiment, the $25^{th}$ transistor may include a 25-$1^{st}$ transistor T25-1 and a 25-$2^{nd}$ transistor T25-2 connected in series and including control electrodes connected to each other. The 25-$1^{st}$ transistor T25-1 may include a control electrode receiving the second signal S2, a first electrode connected to the second electrode of the $24^{th}$ transistor T24, and a second electrode connected to the first intermediate node CN. The 25-$2^{nd}$ transistor T25-2 may include a control electrode connected to the control electrode of the 25-$1^{st}$ transistor T25-1, a first electrode connected to the first intermediate node CN, and a second electrode connected to the first node QN.

In a case that the $25^{th}$ transistor may include only one transistor, in case that the voltage of the first node QN is boosted to a voltage level higher than a voltage level of the high voltage, a voltage between the first electrode and the second electrode of the $25^{th}$ transistor may be large, and accordingly, the $25^{th}$ transistor may be degraded. In the embodiment, the $25^{th}$ transistor may include two transistors T25-1 and T25-2 connected in series with the first intermediate node CN in between, and the $22^{nd}$ transistor (T22) may output the high voltage S6 to the first intermediate node CN. Accordingly, although the voltage of the first node QN is boosted to the voltage level higher than the voltage level of the high voltage, as the high voltage S6 is applied to the first intermediate node CN, the voltage between the first electrode and the second electrode of each of the transistors T25-1 and T25-2 of the $25^{th}$ transistor may not be large, and the $25^{th}$ transistor may not be degraded.

The stabilization portion 290 may output the sixth signal S6 to the second intermediate node BN in response to the voltage of the first node QN. The stabilization portion 290 may include a 28-$1^{st}$ transistor T28-1 and a 28-$2^{nd}$ transistor T28-2. The 28-$1^{st}$ transistor T28-1 may include a control electrode connected to the first node QN, a first electrode, and a second electrode connected to the second intermediate node BN. The 28-$2^{nd}$ transistor T28-2 may include a control electrode connected to the first node QN, a first electrode receiving the sixth signal S6, and a second electrode connected to the first electrode of the 28-$1^{st}$ transistor T28-1.

In a case that each of the $1^{st}$ transistor, the $2^{nd}$ transistor, the $3^{rd}$ transistor, and the $4^{th}$ transistor may include only one transistor, in case that the voltage of the first node QN is boosted to a voltage level higher than the voltage level of the high voltage, a voltage between the first electrode and the second electrode of each of the $1^{st}$ transistor, the $2^{nd}$ transistor, the $3^{rd}$ transistor, and the $4^{th}$ transistor may be large, and accordingly, each of the $1^{st}$ transistor, the $2^{nd}$ transistor, the $3^{rd}$ transistor, and the $4^{th}$ transistor may be degraded. In the embodiment, each of the $1^{st}$ transistor, the $2^{nd}$ transistor, the $3^{rd}$ transistor, and the $4^{th}$ transistor may include two transistors connected in series with the second intermediate node BN in between, and the stabilization portion 290 may output the high voltage S6 to the second intermediate node BN. Accordingly, although the voltage of the first node QN is boosted to the voltage level higher than the voltage level of the high voltage, as the high voltage S6 is applied to the second intermediate node BN, the voltage between the first electrode and the second electrode of each of the $1^{st}$ transistor, the $2^{nd}$ transistor, the $3^{rd}$ transistor, and the $4^{th}$ transistor may not be large, and each of the $1^{st}$ transistor, the $2^{nd}$ transistor, the $3^{rd}$ transistor, and the $4^{th}$ transistor may not be degraded.

Figure 5:
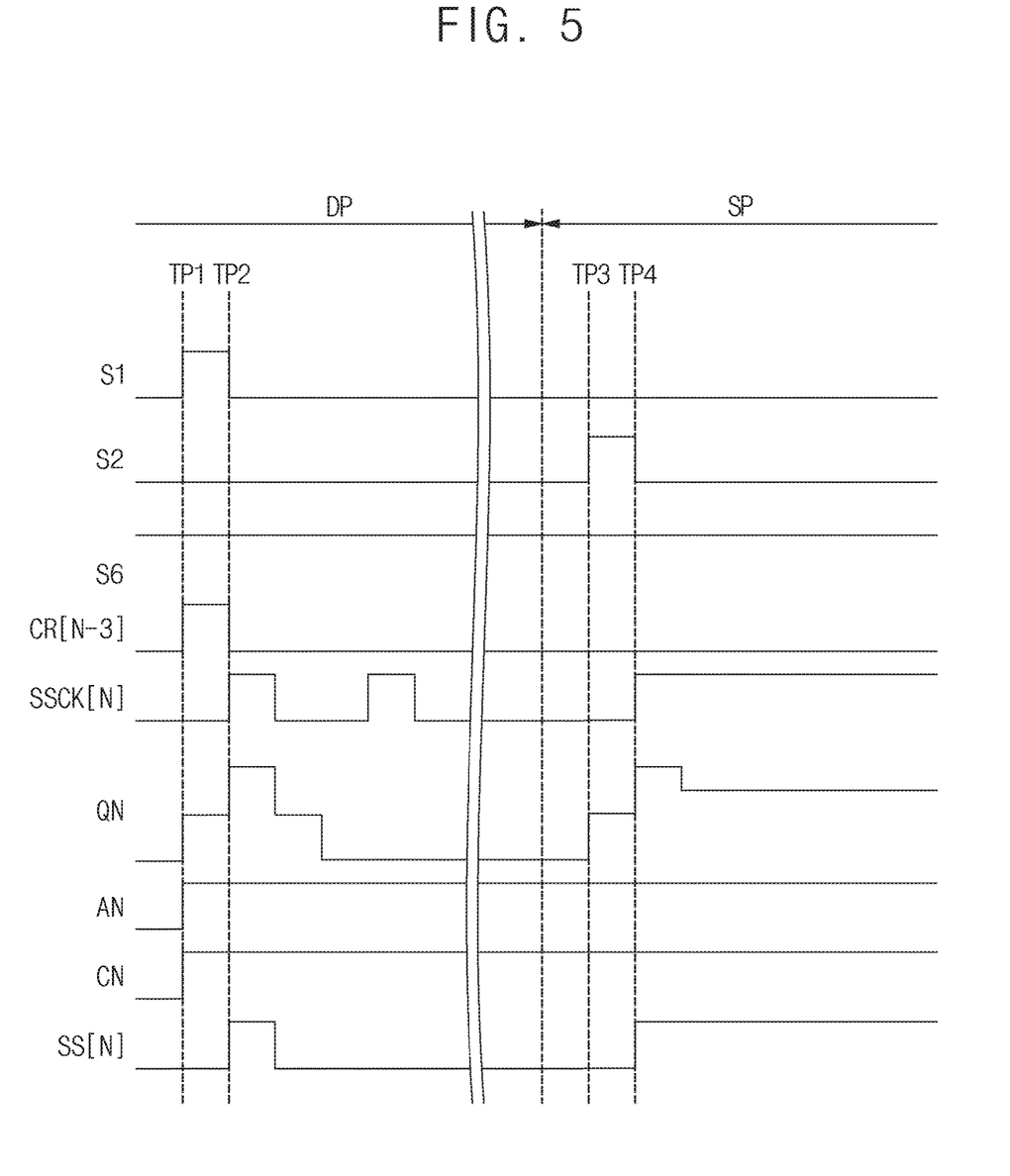
FIG. 5 is a timing diagram for describing an operation of the $N^{th}$ stage in FIG. 4.

FIG. 5 is a timing diagram for describing an operation of the $N^{th}$ stage ST[N] in FIG. 4.

Referring to FIGS. 1, 4, and 5, a frame period of the display device 100 may include a display period DP and a sensing period SP. The pixels PX may emit light in the display period DP, and characteristics of the pixels PX may be sensed in the sensing period SP.

At a first time point TP1 of the display period DP, the $N^{th}$ stage ST[N] may receive the first signal S1 having a high voltage and the previous carry signal CR[N−3] having a high voltage. The 4-$1^{st}$ transistor T4-1 and the 4-$2^{nd}$ transistor T4-2 may be turned-on in response to the high voltage of the previous carry signal CR[N−3], and the high voltage of the previous carry signal CR[N−3] may be applied to the first node QN. Accordingly, the first node QN may be pre-charged with the high voltage at the first time point TP1.

At the first time point TP1, the $21^{st}$ transistor T21 and the $23^{rd}$ transistor T23 may be turned-on in response to the high voltage of the first signal S1, and the high voltage of the previous carry signal CR[N−3] may be applied to the third node AN. The high voltage of the third node AN may maintain even after the first time point TP1 by the $3^{rd}$ capacitor C3. The $22^{nd}$ transistor T22 may be turned-on in response to the high voltage of the third node AN, and the sixth signal S6 which is the high voltage may be applied to the first intermediate node CN. Since the high voltage of the third node AN maintains after the first time point TP1, the $22^{nd}$ transistor T22 may be turned-on even after the first time point TP1, and the high voltage of the first intermediate node CN may maintain even after the first time point TP1. The 28-$1^{st}$ transistor T28-1 and the 28-$2^{nd}$ transistor T28-2 may be turned-on in response to the high voltage of the first node QN, and the sixth signal S6 that is the high voltage may be applied to the second intermediate node BN.

At a second time point TP2 of the display period DP, the $N^{th}$ stage ST[N] may receive the $N^{th}$ sensing clock signal SSCK[N] having a high voltage. The high voltage of the $N^{th}$ sensing clock signal SSCK[N] may be applied to the sensing output node NSS through the turned-on $9^{th}$ transistor T9, a voltage of the first node QN may be boosted to a voltage level higher than the voltage level of the high voltage by the $2^{nd}$ capacitor C2, and the $N^{th}$ sensing signal SS[N] having the high voltage may be output from the sensing output node NSS.

At the second time point TP2, although the voltage of the first node QN is boosted to the voltage level higher than the voltage level of the high voltage, since the high voltage is applied to the first intermediate node CN and the second intermediate node BN, the 25-$1^{st}$ transistor T25-1, the 25-$2^{nd}$ transistor T25-2, the 1-1" transistor T1-1, the 1-$2^{nd}$ transistor T1-2, the 2-$1^{st}$ transistor T2-1, the 2-$2^{nd}$ transistor T2-2, the 3-1" transistor T3-1, the 3-$2^{nd}$ transistor T3-2, the 4-$1^{st}$ transistor T4-1, and the 4-$2^{nd}$ transistor T4-2 may not be degraded.

At a third time point TP3 of the sensing period SP, the $N^{th}$ stage ST[N] may receive the second signal S2 having a high voltage. The 25-Pt transistor T25-1 and the 25-$2^{nd}$ transistor T25-2 may be turned-on in response to the high voltage of the second signal S2, and the sixth signal S6, which is the high voltage, may be applied to the first node QN through the $24^{th}$ transistor T24, the 25-$1^{st}$ transistor T25-1, and the 25-$2^{nd}$ transistor T25-2 which are turned-on. Accordingly, the first node QN may be pre-charged with the high voltage at the third time point TP3.

At the third time point TP3, the 28-$1^{st}$ transistor T28-1 and the 28-$2^{nd}$ transistor T28-2 may be turned-on in response to the high voltage of the first node QN, and the sixth signal S6, which is the high voltage, may be applied to the second intermediate node BN.

At a fourth time point TP4 of the sensing period SP, the $N^{th}$ stage ST[N] may receive the $N^{th}$ sensing clock signal SSCK[N] having a high voltage. The high voltage of the $N^{th}$ sensing clock signal SSCK[N] may be applied to the sensing output node NSS through the turned-on $9^{th}$ transistor T9, a voltage of the first node QN may be boosted to a voltage level higher than the voltage level of the high voltage by the $2^{nd}$ capacitor C2, and the $N^{th}$ sensing signal SS[N] having the high voltage may be output from the sensing output node NSS.

At the fourth time point TP4, although the voltage of the first node QN is boosted to the voltage level higher than the voltage level of the high voltage, since the high voltage is applied to the first intermediate node CN and the second intermediate node BN, the 25-$1^{st}$ transistor T25-1, the 25-$2^{nd}$ transistor T25-2, the 1-$1^{st}$ transistor T1-1, the 1-$2^{nd}$ transistor T1-2, the 2-$1^{st}$ transistor T2-1, the 2-$2^{nd}$ transistor T2-2, the 3-$1^{st}$ transistor T3-1, the 3-$2^{nd}$ transistor T3-2, the 4-$1^{st}$ transistor T4-1, and the 4-$2^{nd}$ transistor T4-2 may not be degraded.

Figure 6:
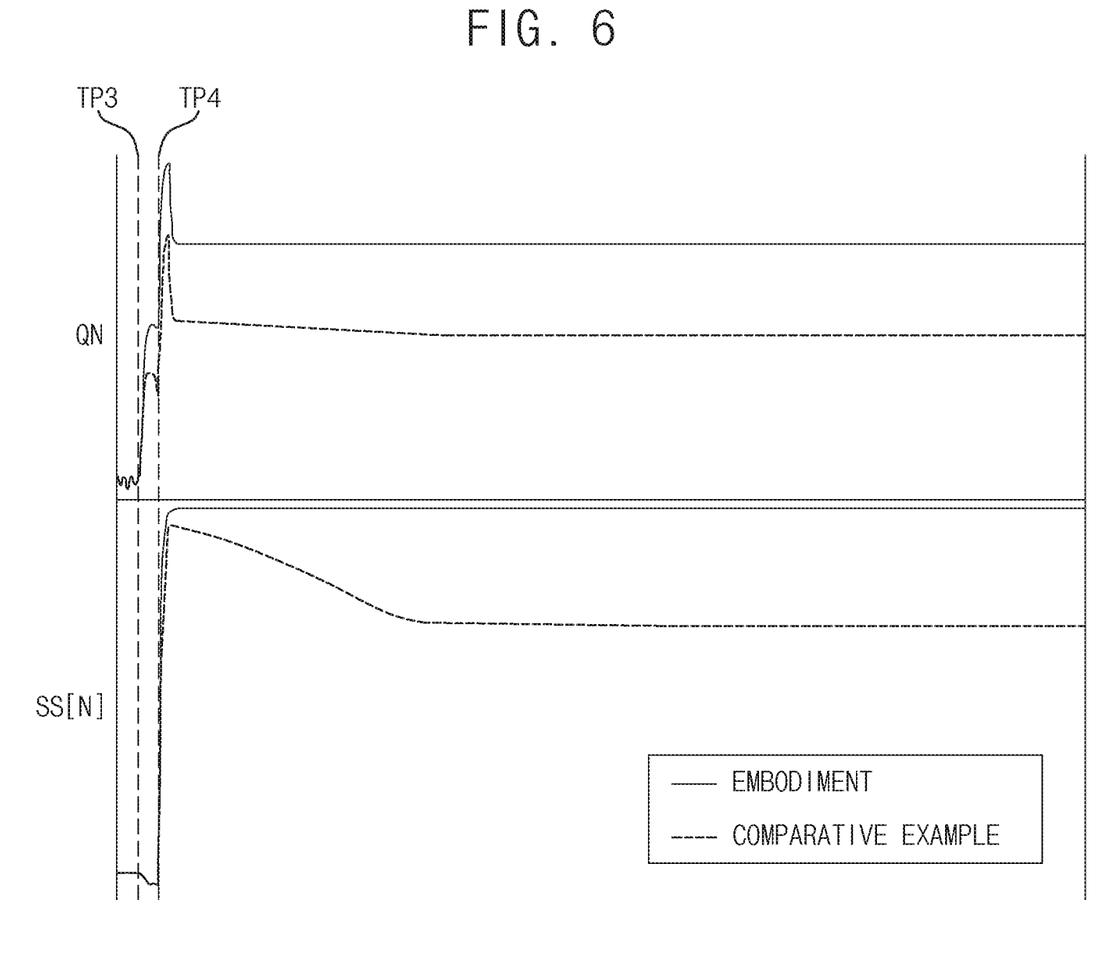
FIG. 6 is a diagram for describing an embodiment and a comparative example.

FIG. 6 is a diagram for describing an embodiment and a comparative example.

Referring to FIGS. 4, 5, and 6, in the comparative example in which a node between the 25-$1^{st}$ transistor T25-1 and the 25-$2^{nd}$ transistor T25-2 is connected to a node between the 4-$1^{st}$ transistor T4-1 and the 4-$2^{nd}$ transistor T4-2 (in other words, the node between the 25-$1^{st}$ transistor T25-1 and the 25-$2^{nd}$ transistor T25-2 is connected to the second intermediate node BN instead of the first intermediate node AN), at the third time point TP3, some of current flowing through the $24^{th}$ transistor T24, the 25-$1^{st}$ transistor T25-1, and the 25-$2^{nd}$ transistor T25-2 may leak through the 4-$2^{nd}$ transistor T4-2 connected by the second intermediate node BN, and the first node QN may be pre-charged to a voltage level lower than the voltage level of the high voltage. Accordingly, a voltage level of the $N^{th}$ sensing signal SS[N] output from the sensing output node NSS at the fourth time point TP4 may be lowered, and a driving margin of the $N^{th}$ sensing signal SS[N] may decrease.

In the embodiment, the first intermediate node CN between the 25-$1^{st}$ transistor T25-1 and the 25-$2^{nd}$ transistor T25-2 may be separated from the second intermediate node BN between the 4-$1^{st}$ transistor T4-1 and the 4-$2^{nd}$ transistor T4-2, so that, at the third time point TP3, current flowing through the $24^{th}$ transistor T24, the 25-$1^{st}$ transistor T25-1, and the 25-$2^{nd}$ transistor T25-2 may not leak through the 4-$2^{nd}$ transistor T4-2, and the first node QN may be pre-charged with the high voltage. Accordingly, the voltage level of the $N^{th}$ sensing signal SS[N] output from the sensing output node NSS at the fourth time point TP4 may be sufficiently high, and the driving margin of the $N^{th}$ sensing signal SS[N] may not decrease.

Figure 7:
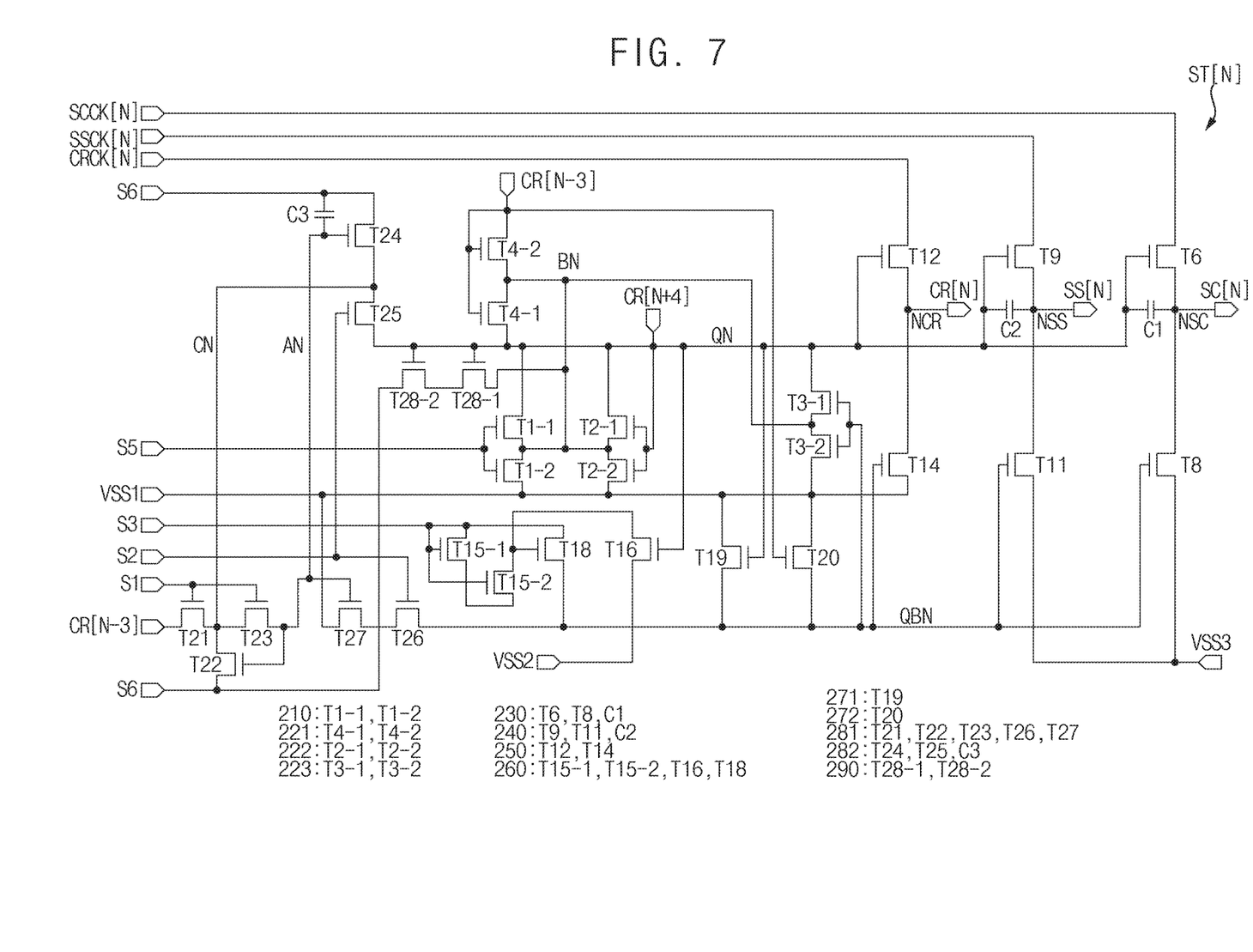
FIG. 7 is a schematic circuit diagram illustrating an example of an $N^{th}$ stage included in the gate driver in FIG. 3.

FIG. 7 is a schematic circuit diagram illustrating an example of the $N^{th}$ stage ST[N] included in the gate driver 200 in FIG. 3.

Referring to FIG. 7, the $N^{th}$ stage ST[N] may include a reset portion 210, a first pull-up control portion 221, a second pull-up control portion 222, a third pull-up control portion 223, a scan output portion 230, a sensing output portion 240, a carry output portion 250, an inverting portion 260, a first pull-down control portion 271, a second pull-down control portion 272, a first sensing portion 281, a second sensing portion 282, and a stabilization portion 290. The $N^{th}$ stage ST[N] described with reference to FIG. 7 may be substantially the same as or similar to the $N^{th}$ stage ST[N] described with reference to FIG. 3 except for the second sensing portion 282. Accordingly, descriptions of repeated components will be omitted.

The second sensing portion 282 may include a $24^{th}$ transistor T24, a $25^{th}$ transistor T25, and a $3^{rd}$ capacitor C3. The $24^{th}$ transistor T24 may include a control electrode connected to the third node AN, a first electrode receiving the sixth signal S6, and a second electrode connected to the first intermediate node CN. The $25^{th}$ transistor T25 may include a control electrode receiving the second signal S2, a first electrode connected to the first intermediate node CN, and a second electrode connected to the first node QN. The $3^{rd}$ capacitor C3 may include a first electrode receiving the sixth signal S6 and a second electrode connected to the third node AN.

In a case that a node between the $24^{th}$ transistor T24 and the $25^{th}$ transistor T25 is not connected to the first intermediate node CN, in case that a voltage of the first node QN is boosted to a voltage level higher than the voltage level of the high voltage, a voltage between the first electrode of the $24^{th}$ transistor T24 and the second electrode of the $25^{th}$ transistor T25 may be large, and accordingly, the $24^{th}$ transistor T24 and the $25^{th}$ transistor T25 may be degraded. In the embodiment, the node between the $24^{th}$ transistor T24 and the $25^{th}$ transistor T25 may be connected to the first intermediate node CN, and the $22^{nd}$ transistor T22 may output the high voltage S6 to the first intermediate node CN. Accordingly, although the voltage of the first node QN is boosted to the voltage level higher than the voltage level of the high voltage, as the high voltage S6 is applied to the first intermediate node CN, a voltage between the first electrode and the second electrode of the $24^{th}$ transistor T24 and the $25^{th}$ transistor T25 may not be large, and the $24^{th}$ transistor T24 and the $25^{th}$ transistor T25 may not be degraded.

Figure 8:
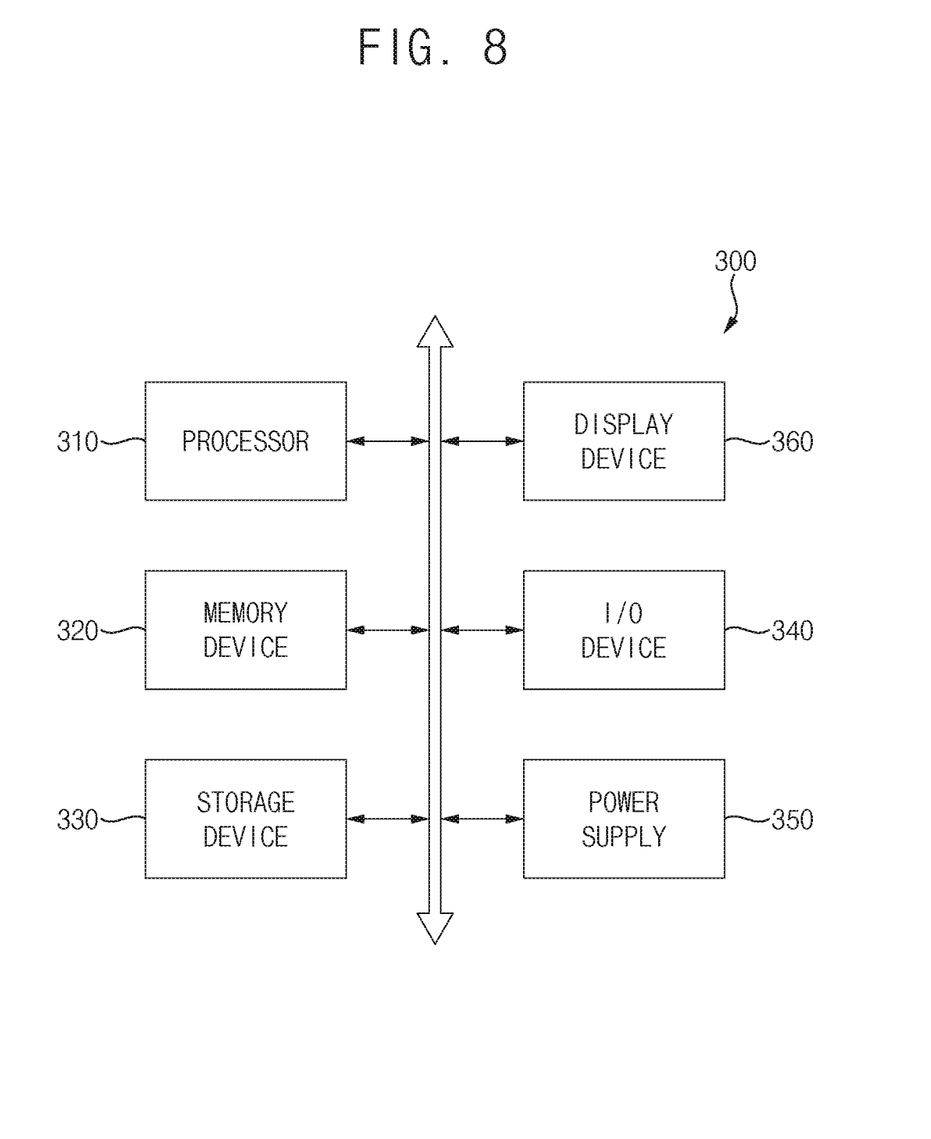
FIG. 8 is a block diagram illustrating an electronic apparatus including a display device according to an embodiment.

FIG. 8 is a block diagram illustrating an electronic apparatus 300 including a display device 360 according to an embodiment.

Referring to FIG. 8, an electronic apparatus 300 may include a processor 310, a memory device 320, a storage device 330, an input/output ("I/O") device 340, a power supply 350, and a display device 360. The display device 360 may correspond to the display device 100 in FIG. 1. The electronic apparatus 300 may further include a plurality of ports for communicating with a video card, a sound card, a memory card, a universal serial bus ("USB") device, etc.

The processor 310 may perform selectable calculations or tasks. In an embodiment, the processor 310 may be a microprocessor, a central processing unit ("CPU"), or the like within the spirit and the scope of the disclosure. The processor 310 may be coupled or connected to other components via an address bus, a control bus, a data bus, or the like within the spirit and the scope of the disclosure. In an embodiment, the processor 310 may be coupled or connected to an extended bus such as a peripheral component interconnection ("PCI") bus.

The memory device 320 may store data for operations of the electronic apparatus 300. In an embodiment, the memory device 320 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 330 may include a solid state drive ("SSD") device, a hard disk drive ("HDD") device, a CD-ROM device, or the like within the spirit and the scope of the disclosure. The I/O device 340 may include an input device such as a keyboard, a keypad, a touchpad, a touch-screen, a mouse device, etc., and an output device such as a speaker, a printer, etc. The power supply 350 may supply a power required for the operation of the electronic apparatus 300. The display device 360 may be coupled or connected to other components via the buses or other communication links.

A gate driving circuit included in the display device 360 may include a stage in which a first intermediate node between transistors of a second sensing portion is separated from a second intermediate node between transistors of a first pull-up control portion, so that current leakage through the second intermediate node from the first intermediate node in a sensing period may not occur. Further, a voltage level of a gate signal output from the gate driving circuit may not decrease, so that reliability of the display device 360 may be improved.

The display device according to the embodiments may be applied to a display device included in a computer, a notebook, a mobile phone, a smart phone, a smart pad, a PMP, a PDA, an MP3 player, or the like within the spirit and the scope of the disclosure.

Although the gate driving circuits and the display devices according to embodiments have been described with reference to the drawings, the illustrated embodiments are examples, and may be modified and changed one of ordinary skill in the art without departing from the spirit and scope of the disclosure and as described in the following claims.

What is claimed is:

1. A gate driving circuit, comprising:
    a stage which outputs a scan signal based on a scan clock signal, a voltage of a first node, and a voltage of a second node, and outputs a sensing signal based on a sensing clock signal, a voltage of the first node, and a voltage of the second node, wherein
    the stage includes a first sensing portion including transistors electrically connected in series and a first pull-up control portion including transistors electrically connected in series, the transistors including control electrodes electrically connected to each other,
    a first intermediate node between the transistors of the first sensing portion is separated from a second intermediate node between the transistors of the first pull-up control portion,
    the first sensing portion includes a first-first sensing transistor, a first-second sensing transistor, a first-third sensing transistor, and a first capacitor,
    the first-first sensing transistor includes a control electrode electrically connected to a third node, a first electrode receiving a high voltage, and a second electrode,
    the first-second sensing transistor includes a control electrode receiving a first signal, a first electrode electrically connected to the second electrode of the first-first sensing transistor, and
a second electrode electrically connected to the first intermediate node,
    the first-third sensing transistor includes a control electrode electrically connected to the control electrode of the first-second sensing transistor, a first electrode electrically connected to the first intermediate node, and a second electrode electrically connected to the first node, and
    the first capacitor includes a first electrode receiving the high voltage and a second electrode electrically connected to the third node.

2. The gate driving circuit of claim 1, wherein
    the stage further includes a second sensing portion,
    the second sensing portion includes a second-first sensing transistor, a second-second sensing transistor, and a second-third sensing transistor,
    the second-first sensing transistor includes a control electrode receiving a second signal, a first electrode receiving a previous carry signal, and a second electrode electrically connected to the first intermediate node,
    the second-second sensing transistor includes a control electrode electrically connected to the third node, a first electrode receiving the high voltage, and a second electrode electrically connected to the first intermediate node, and
    the second-third sensing transistor includes a control electrode receiving the second signal, a first electrode electrically connected to the first intermediate node, and a second electrode electrically connected to the third node.

3. The gate driving circuit of claim 2, wherein the transistors of the first sensing portion are the first-second sensing transistor and the first-third sensing transistor.

4. The gate driving circuit of claim 2, wherein
    the second sensing portion further includes a second-fourth sensing transistor and a second-fifth sensing transistor, the second-fourth sensing transistor includes a control electrode receiving the first signal, a first electrode, and a second electrode electrically connected to the second node, and the second-fifth sensing transistor includes a control electrode electrically connected to the third node, a first electrode receiving a first low voltage, and a second electrode electrically connected to the first electrode of the second-fourth sensing transistor.

5. The gate driving circuit of claim 1, wherein
the first pull-up control portion includes a first-first pull-up transistor and a first-second pull-up transistor,
the first-first pull-up transistor includes a control electrode receiving a previous carry signal, a first electrode electrically connected to the second intermediate node, and a second electrode electrically connected to the first node, and
the first-second pull-up transistor includes a control electrode electrically connected to the control electrode of the first-first pull-up transistor, a first electrode receiving the previous carry signal, and a second electrode electrically connected to the second intermediate node.

6. The gate driving circuit of claim 5, wherein
the stage further includes a second pull-up control portion,
the second pull-up control portion includes a second-first pull-up transistor and a second-second pull-up transistor,
the second-first pull-up transistor includes a control electrode receiving a subsequent carry signal, a first electrode electrically connected to the second intermediate node, and a second electrode electrically connected to the first node, and
the second-second pull-up transistor includes a control electrode electrically connected to the control electrode of the second-first pull-up transistor, a first electrode receiving a first low voltage, and a second electrode electrically connected to the second intermediate node.

7. The gate driving circuit of claim 6, wherein
the stage further includes a third pull-up control portion,
the third pull-up control portion includes a third-first pull-up transistor and a third-second pull-up transistor,
the third-first pull-up transistor includes a control electrode electrically connected to the second node, a first electrode electrically connected to the second intermediate node, and a second electrode electrically connected to the first node, and
the third-second pull-up transistor includes a control electrode electrically connected to the control electrode of the third-first pull-up transistor, a first electrode receiving the first low voltage, and a second electrode electrically connected to the second intermediate node.

8. The gate driving circuit of claim 7, wherein
the stage further includes a reset portion,
the reset portion includes a first reset transistor and a second reset transistor,
the first reset transistor includes a control electrode receiving a fifth signal, a first electrode electrically connected to the second intermediate node, and a second electrode electrically connected to the first node, and
the second reset transistor includes a control electrode electrically connected to the control electrode of the first reset transistor, a first electrode receiving the first low voltage, and a second electrode electrically connected to the second intermediate node.

9. The gate driving circuit of claim 1, wherein
the stage further includes a scan output portion,
the scan output portion includes a first scan output transistor, an second scan output transistor, and a second capacitor,
the first scan output transistor includes a control electrode electrically connected to the first node, a first electrode receiving the scan clock signal, and a second electrode electrically connected to a scan output node outputting the scan signal,
the second scan output transistor includes a control electrode electrically connected to the second node, a first electrode receiving a third low voltage, and a second electrode electrically connected to the scan output node, and
the second capacitor includes a first electrode electrically connected to the first node and a second electrode electrically connected to the scan output node.

10. The gate driving circuit of claim 9, wherein
the stage further includes a sensing output portion,
the sensing output portion includes a third scan output transistor, an fourth scan output transistor, and a third capacitor,
the third scan output transistor includes a control electrode electrically connected to the first node, a first electrode receiving the sensing clock signal, and a second electrode electrically connected to a sensing output node outputting the sensing signal,
the fourth scan output transistor includes a control electrode electrically connected to the second node, a first electrode receiving the third low voltage, and a second electrode electrically connected to the sensing output node, and
the third capacitor includes a first electrode electrically connected to the first node and a second electrode electrically connected to the sensing output node.

11. The gate driving circuit of claim 10, wherein
the stage further includes a carry output portion,
the carry output portion includes a first carry output transistor and a second carry output transistor,
the first carry output transistor includes a control electrode electrically connected to the first node, a first electrode receiving a carry clock signal, and a second electrode electrically connected to a carry output node outputting a carry signal, and
the second carry output transistor includes a control electrode electrically connected to the second node, a first electrode receiving a first low voltage, and a second electrode electrically connected to the carry output node.

12. The gate driving circuit of claim 1, wherein
the stage further includes an inverting portion,
the inverting portion includes a first-first inverting transistor, a first-second inverting transistor, and a second inverting transistor,
the first-first inverting transistor includes a control electrode receiving a third signal, a first electrode receiving the third signal, and a second electrode,
the first-second inverting transistor includes a control electrode electrically connected to the control electrode of the first-first inverting transistor, a first electrode electrically connected to the second electrode of the first-first inverting transistor, and a second electrode, and
the second inverting transistor includes a control electrode electrically connected to the second electrode of the first-second inverting transistor, a first electrode receiving the third signal, and a second electrode electrically connected to the second node.

13. The gate driving circuit of claim 12, wherein
the inverting portion further includes a third inverting transistor, and
the third inverting transistor includes a control electrode electrically connected to the first node, a first electrode receiving a second low voltage, and a second electrode electrically connected to the control electrode of the second inverting transistor.

14. The gate driving circuit of claim 1, wherein the stage further includes a first pull-down control portion which outputs a first low voltage to the second node in response to a voltage of the first node.

15. The gate driving circuit of claim 14, wherein the stage further includes a second pull-down control portion which outputs the first low voltage to the second node in response to a previous carry signal.

16. The gate driving circuit of claim 1, wherein the stage further includes a stabilization portion which outputs a high voltage to the second intermediate node in response to a voltage of the first node.

17. A display device, comprising:
a display panel;
a gate driver which outputs a plurality of scan signals and a plurality of sensing signals to the display panel; and
a data driver which outputs a plurality of data voltages to the display panel, wherein
the gate driver includes a stage which outputs a scan signal among the plurality of the scan signals based on a scan clock signal, a voltage of a first node, and a voltage of a second node, and outputs a sensing signal among the plurality of sensing signals based on a sensing clock signal, a voltage of the first node, and a voltage of the second node,
the stage includes a sensing portion including transistors electrically connected in series and a pull-up control portion including transistors electrically connected in series, the transistors including control electrodes electrically connected to each other,
a first intermediate node between the transistors of the sensing portion is separated from a second intermediate node between the transistors of the pull-up control portion,
the sensing portion includes a first-first sensing transistor, a first-second sensing transistor, a first-third sensing transistor, and a first capacitor,
the first-first sensing transistor includes a control electrode electrically connected to a third node, a first electrode receiving a high voltage, and a second electrode,
the first-second sensing transistor includes a control electrode receiving a first signal a first electrode electrically connected to the second electrode of the first-first sensing transistor, and
a second electrode electrically connected to the first intermediate node,
the first-third sensing transistor includes a control electrode electrically connected to the control electrode of the first-second sensing transistor, a first electrode electrically connected to the first intermediate node, and a second electrode electrically connected to the first node, and
the first capacitor includes a first electrode receiving the high voltage and a second electrode electrically connected to the third node.

\* \* \* \* \*